US012460657B2

(12) United States Patent
Lindörfer

(10) Patent No.: US 12,460,657 B2
(45) Date of Patent: Nov. 4, 2025

(54) SHUTTLE VALVE, DIRECTIONAL CONTROL VALVE MODULE, AND PNEUMATIC OR HYDRAULIC ASSEMBLY

(71) Applicant: Voith Patent GmbH, Heidenheim (DE)

(72) Inventor: Steffen Lindörfer, Schrozberg (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 18/748,398

(22) Filed: Jun. 20, 2024

(65) Prior Publication Data

US 2024/0376912 A1 Nov. 14, 2024

Related U.S. Application Data

(63) Continuation of application No. PCT/EP2022/086068, filed on Dec. 15, 2022.

(30) Foreign Application Priority Data

Dec. 20, 2021 (DE) ..................... 10 2021 133 815.8
Mar. 2, 2022 (DE) ..................... 10 2022 104 893.4

(51) Int. Cl.
*F15B 13/02* (2006.01)
*F15B 13/04* (2006.01)
*F15B 20/00* (2006.01)

(52) U.S. Cl.
CPC ........ *F15B 13/0402* (2013.01); *F15B 13/028* (2013.01); *F15B 20/008* (2013.01);
(Continued)

(58) Field of Classification Search
CPC .. F15B 13/0402; F15B 13/028; F15B 20/002; F15B 20/008; F15B 2211/3052;
(Continued)

(56) References Cited

U.S. PATENT DOCUMENTS 3,305,215 A 2/1967 Swiecicki et al.
2019/0061916 A1* 2/2019 Maver .................. F15B 20/008
(Continued)

FOREIGN PATENT DOCUMENTS

DE 10 2008 035 112 A1 2/2009
DE 10 2014 218 753 A1 3/2016
EP 1 953 431 A2 8/2008

OTHER PUBLICATIONS

German Office Action dated Oct. 28, 2022 for German Patent Application No. 10 2022 104 893.4 (10 pages).
(Continued)

*Primary Examiner* — Kelsey E Cary
(74) *Attorney, Agent, or Firm* — TAYLOR & EDELSTEIN, PC

(57) ABSTRACT

A shuttle valve includes: a first valve body; a second valve body, a first control-pressure-charged surface and a second control-pressure-charged surface of the first valve body being larger than a third control-pressure-charged surface and a fourth control-pressure-charged surface of the second valve body, a first control pressure from a first inlet pressure port being applied to a first valve body first side, the first control pressure from a second inlet pressure port being applied to a first valve body second side, a second control pressure from a third inlet pressure port being applied to a second valve body first side, the second control pressure from a fourth inlet pressure port being applied to a second valve body second side, a first control pressure acting on a first control-pressure-charged surface and a second control-pressure-charged surface, and the second control pressure acting on a third control-pressure-charged surface and a fourth control-pressure-charged surface.

17 Claims, 2 Drawing Sheets

(52) U.S. Cl.
CPC ................. *F15B 2211/3052* (2013.01); *F15B 2211/8757* (2013.01)

(58) Field of Classification Search
CPC .... F15B 2211/30565; F15B 2211/3105; F15B 2211/3116; F15B 2211/3122; F15B 2211/8623; F15B 2211/8636; F15B 2211/8752; F15B 2211/8757
See application file for complete search history.

(56) References Cited

U.S. PATENT DOCUMENTS

| | | | | |
|---|---|---|---|---|
| 2019/0257328 | A1* | 8/2019 | Erikksson ............. | F15B 20/008 |
| 2021/0262494 | A1 | 8/2021 | Slattery et al. | |

OTHER PUBLICATIONS

Notification of the Transmission of the International Search Report and Written Opinion of the International Search Authority or Declaration dated Mar. 15, 2023 for International Application No. PCT/EP2022/086068 (14 pages).

* cited by examiner (State of the Art)

SHUTTLE VALVE, DIRECTIONAL CONTROL VALVE MODULE, AND PNEUMATIC OR HYDRAULIC ASSEMBLY

CROSS REFERENCE TO RELATED APPLICATIONS

This is a continuation of PCT application no. PCT/EP2022/086068, entitled "SHUTTLE VALVE, DIRECTIONAL CONTROL VALVE MODULE, AND PNEUMATIC OR HYDRAULIC ASSEMBLY", filed Dec. 15, 2022, which is incorporated herein by reference. PCT application no. PCT/EP2022/086068 claims priority to: (a) German patent application no. 10 2021 133 815.8, filed Dec. 20, 2021, which is incorporated herein by reference; and (b) German patent application no. 10 2022 104 893.4, filed Mar. 2, 2022, which is incorporated herein by reference.

BACKGROUND OF THE INVENTION

1. Field of the Invention

The present invention relates to a shuttle valve.

2. Description of the Related Art

In practice, directional control valve modules of the type in question including two electrohydraulic position controllers arranged in parallel, each including a continuously actuatable directional valve for actuating a single-acting cylinder, are used. A corresponding hydraulic assembly is shown in FIG. 1. The first directional valve 31 provides a first control pressure at an inlet pressure port 11 of the shuttle valve 10, and the second directional valve 32 redundantly provides a first control pressure at an inlet pressure port 13 of the shuttle valve 10. The shuttle valve 10 combines the two present control pressures of the directional valves 31, 32 into a shared control pressure line 1 by way of a maximum selection, wherein the control pressure line 1 is connected to the single-acting cylinder 40' so as to apply the first control pressure to the piston chamber 41, so that the first control pressure actuates the piston 42 of the cylinder 40' against the force of the piston spring 43.

In this way, the cylinder 40', which is equipped, for example, with a position sensor and has spring return, can be positioned continuously and essentially hysteresis-free.

Due to the provision of two directional valves 31, 32, a redundantly designed regulating system including two controlled variable outputs acting on a shared outlet is created. In the event of a fault, a defective directional valve 31, 32 or a component assigned to the directional valve 31, 32, such as a pressure gauge or a pressure transducer, can be replaced with a replacement device during the operation of the hydraulic assembly.

When the two directional valves 31, 32 are set equally in terms of the transfer function, for example in that two controlled variable outputs of a higher-level, redundantly designed regulating system form the target values for the directional valves 31, 32, in the event that the function of one of the two directional valves 31, 32 fails, for example due to a broken wire of the included electromagnetic drive, the actuating force of the directional valve 31, 32 becomes equal to zero, and the return spring 35 of the corresponding directional valve 31, 32 pushes the directional valve piston 34 into the relief position, so that the corresponding inlet pressure port 11, 13 of the shuttle valve 10 is switched to "tank," that is, is connected to the tank connection T of the directional valve 31, 32. The valve body 17 of the shuttle valve 10 automatically closes the inlet pressure port 11, 13 to which the defective directional valve 31, 32 is connected. The other directional valve 31, 32 automatically assumes the control of the control pressure in the control pressure line 1 so that the operation continues. A pressure gauge or pressure transducer at the defective directional valve 31, 32 indicates the pressure at the tank return line, in particular 0 bar, and the defective directional valve 31, 32 can be uninstalled and replaced during operation after a corresponding ball valve of the pressure supply (P1 or P2) has been closed.

If such a directional control valve module 30, as it is shown in FIG. 1, were to be expanded by being provided with two shuttle valves 10.1, 10.2 so as to be operated with a double-acting cylinder 40, the hydraulic assembly shown in FIG. 2 would be obtained. Components that correspond to one another are denoted by corresponding reference signs in FIG. 1. When a directional valve 31, 32 fails, the full supply pressure P acts on the connected shuttle valve 10.1, 10.2, and thus on the side of the piston 42 of the cylinder 40 which is connected via the first control pressure line 1 or second control pressure line 2. The piston 42 would always move to the corresponding end position. The second, still functional directional valve 31, 32 would have no possibility to maintain the positioning of the piston 42, and thus the function of the cylinder 40. The maximum pressure P of the defective directional valve 31, 32 always prevails.

The function of the hydraulic assembly could only be restored again if the supply pressure P at the failed directional valve 31, 32 were shut off manually, for example by way of a ball valve. This function restriction is disadvantageous in practical applications which require highly available systems.

What is needed in the art is a shuttle valve, a directional control valve module including such a shuttle valve, and a pneumatic or hydraulic assembly including such a directional control valve module, which are able to maintain the full function of an actuator, in particular a cylinder, to which the control pressure is applied, even if one directional valve fails.

SUMMARY OF THE INVENTION

The present invention relates to a shuttle valve for selecting a maximum pressure in two control pressure lines that are separate from one another, to a directional control valve module including two redundant directional valves and a shuttle valve, as well as a pneumatic or hydraulic assembly including a double-acting cylinder and a directional control valve module.

A shuttle valve according to the present invention for selecting a maximum pressure in two control pressure lines that are separate from one another, such as are used, for example, for activating an actuator or multiple actuators, in particular a double-acting cylinder, has a first inlet pressure port and a second inlet pressure port for a first control pressure. Furthermore, a third inlet pressure port and a fourth inlet pressure port for a second control pressure are provided. The first control pressure can be at least temporarily larger or smaller than the second control pressure. In particular, the two control pressures are those pressures that are to be supplied as control pressures to a double-acting cylinder, for example, the first control pressure on a first side of the cylinder piston and the second control pressure on a second opposite side of the cylinder piston. The shuttle valve according to the present invention, however, can also be employed in actuators other than cylinders.

The shuttle valve according to the present invention has a first outlet pressure port for connecting the first control pressure line and a second outlet pressure port for connecting the second control pressure line, so as to accordingly provide one of the two control pressures in the first control pressure line and the other of the two control pressures in the second control pressure line.

A first valve body is provided in a fluid-conducting connection between the first and second inlet pressure ports on the one hand and the first outlet pressure port on the other hand, and a second valve body is provided between the third and fourth inlet pressure ports on the one hand and the second outlet pressure port on the other hand. The first control pressure from the first inlet pressure port is applied to a first side of the first valve body, and the first control pressure from the second inlet pressure port is applied to a second side situated opposite the first side. The second control pressure from the third inlet pressure port is applied to a first side of the second valve body, and the second control pressure from the fourth inlet pressure port is applied to a second side situated opposite the first side.

According to the present invention, the first control pressure acts on a first and a second control-pressure-charged surface of the first valve body, and the second control pressure acts on each of a third and fourth control-pressure-charged surface of the second valve body. The first and second control-pressure-charged surfaces are in each case larger than the third and fourth control-pressure-charged surfaces, and the first valve body and the second valve body are positively coupled so as to be displaced together. In particular, the first control-pressure-charged surface and the second control-pressure-charged surface are equal in size, and the third control-pressure-charged surface and the fourth control-pressure-charged surface are equal in size.

The positive coupling and the surface ratios, which are different from 1, of the first control-pressure-charged surface to the third control-pressure-charged surface, or the second control-pressure-charged surface to the fourth control-pressure-charged surface, prevent the full supply pressure from flowing unimpaired into the first or second control pressure line. When two directional valves are connected to the shuttle valve, the non-defective directional valve can retain the control authority and continue to maintain the control function thereof.

Optionally, a coupling element is provided, which mechanically transmits a displacement of the first valve body to the second valve body. In this way, a compact design and a safe mode of operation can be achieved.

According to an optional embodiment of the present invention, the first valve body has a multi-piece design and includes a first valve body part and a second valve body part. The second valve body can likewise have a multi-piece design, including at least one third valve body part and a fourth valve body part. The coupling element can be positioned between the first valve body part and the second valve body part on the one hand, and between the third valve body part and the fourth valve body part on the other hand. The valve body parts can rest freely against the coupling element, in particular by way of an interposed spacer element, whereby, in turn, mechanical positive coupling is achieved. In this way, a safe mode of operation and a compact design are achieved.

The first valve body part particularly optionally cooperates with a first valve seat so as to form a first sealing point, the second valve body part cooperates with a second valve seat so as to form a second sealing point, the third valve body part cooperates with a third valve seat so as to form a third sealing point, and the fourth valve body part cooperates with a fourth valve seat so as to form a fourth sealing point. Each of the sealing points can be formed by a valve seat in a shared one-piece or multi-piece housing of the shuttle valve, wherein each of the valve body parts in the sealing state accordingly rests against the assigned valve seat.

The first inlet pressure port can be sealed by way of the first sealing point, the second inlet pressure port can be sealed by way of the second sealing point, the third inlet pressure port can be sealed by way of the third sealing point, and the fourth inlet pressure part can be sealed by way of the fourth sealing point. In this way, the function according to the present invention of the shuttle valve is achieved particularly easily.

So as to be able to suitably control the pressure in the control pressure lines even when pressure is erroneously present in one or two inlet pressure ports, for example due to a failure in an upstream directional valve, as is explained here, and to avoid leakages, the third valve body part can optionally cooperate with a fifth valve seat so as to form a fifth sealing point, and the fourth valve body part can cooperate with a sixth valve seat so as to form a sixth sealing point, and the fifth valve seat can be situated axially opposite the third valve seat and the sixth valve seat can be situated axially opposite the fourth valve seat in such a way that the third inlet pressure port can be sealed, based on the position of the third valve body part, by way of the third sealing point and by way of the fifth sealing point, and the fourth inlet pressure port can be sealed, based on the position of the fourth valve body part, by way of the fourth sealing point and by way of the sixth sealing point. However, based on the pressure differential present across the valve body part, the valve body part, which is not permanently pressed against the third or fourth valve seat, can also assume an intermediate position, in which it is lifted off the two valve seats which are assigned to it and situated axially opposite one another.

So as to achieve a particularly favorable design, the first valve body part, the coupling element, and the second valve body part can be arranged one behind the other in a first direction, and the third valve body part, the coupling element, and the fourth valve body part can be arranged one behind the other in a second direction extending perpendicularly or obliquely to the first direction.

According to one embodiment, the coupling element is spherical.

In addition or as an alternative, the valve body parts can also be spherical.

If a spacer element is provided between the coupling element and at least one, several or all of the valve body parts, by way of which the coupling element is supported on the respective valve body part, this spacer element can also be spherical.

The coupling element and the valve body, in particular the valve body parts, optionally rest freely against one another, for example by way of interposed spacer elements. Optionally, preloading can be achieved by way of one or more spring elements, in particular compression springs; however, this is not mandatory. According to another embodiment, the resting against one another can be achieved solely by the pressures that are present at the inlet pressure ports.

A directional control valve module according to the present invention includes two redundantly designed directional valves and one shuttle valve of the type described herein according to the present invention, wherein the two directional valves in each case provide the first control pressure and the second control pressure and are connected in each case in a control pressure-conducting manner to two inlet pressure ports, namely the first directional valve is connected to the first and third inlet pressure ports and the second directional valve is connected to the second and fourth inlet pressure ports of the shuttle valve.

The directional valves are optionally designed in each case as continuously adjustable directional valves with electromagnetic actuation.

In particular, each of the directional valves includes a solenoid, serving as a drive, that displaces a valve piston against the force of a return spring of the directional valve.

A pneumatic or hydraulic assembly according to the present invention including a double-acting cylinder, which has a piston chamber and a piston displaceable in the piston chamber, is provided with a directional control valve module of the type described herein according to the present invention, wherein the first outlet pressure port is connected on a first side of the piston via the first control pressure line in a pressure-conducting manner to the piston chamber, and the second outlet pressure port is connected on an opposite second side of the piston via the second control pressure line in a pressure-conducting manner to the piston chamber.

Electrical auxiliary energy and hydraulic auxiliary energy can be provided for operating the directional control valve module according to the present invention. All of the electric control systems and circuits necessary for the operation of the directional control valve module can be provided in an assigned control solenoid or a control solenoid device, which is hydraulically and electrically connected on the inlet side to the directional valves. Upon activation of the double-acting cylinder, all control circuit parameters and the parameters for scaling the piston position or piston rod position can be set using potentiometers and/or software with digital control electronics at the control solenoid.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
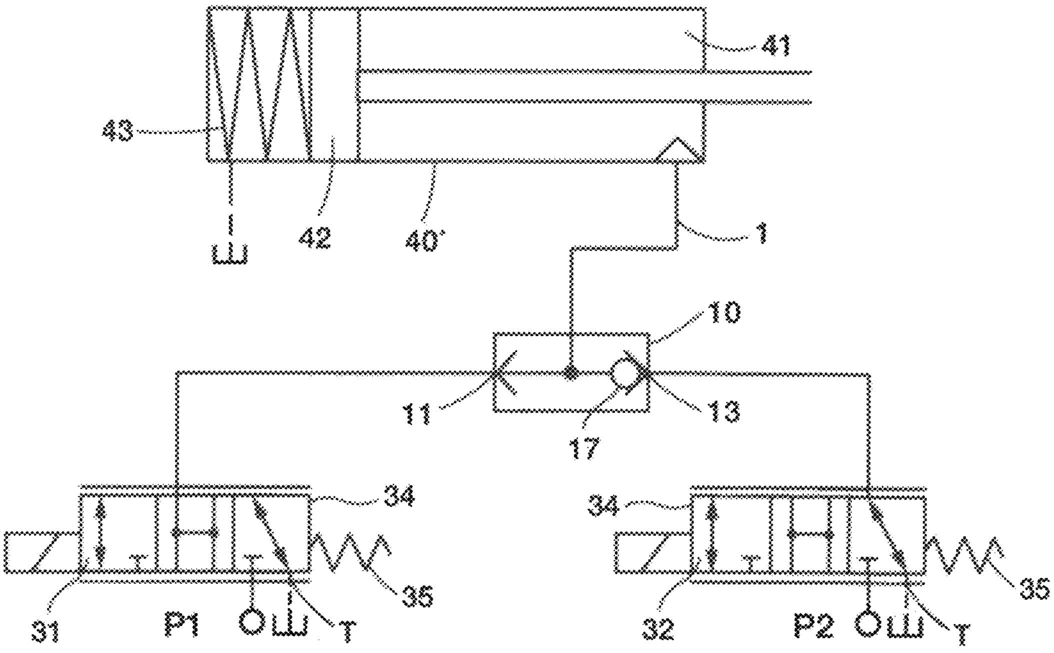
FIG. 1 shows a hydraulic assembly including a directional control valve module according to the state of the art.
Figure 2:
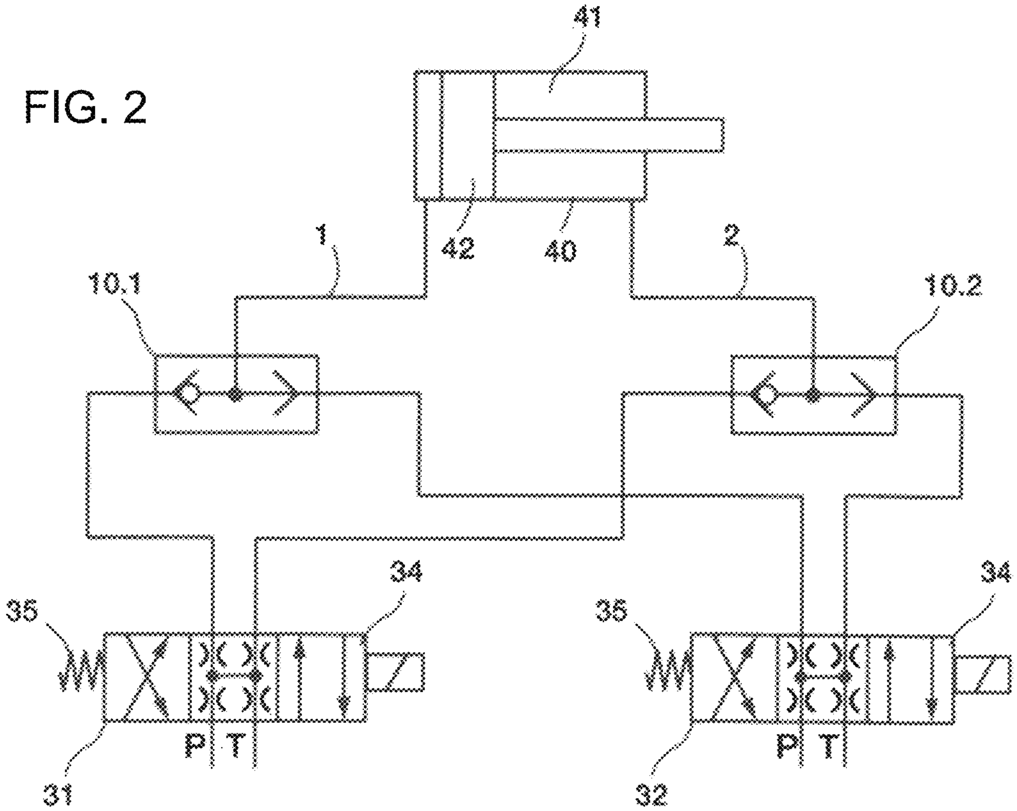
FIG. 2 shows a hydraulic assembly including a directional control valve module in a logical expansion of the directional control valve module from FIG. 1 for activating a double-acting cylinder.
Figure 3:
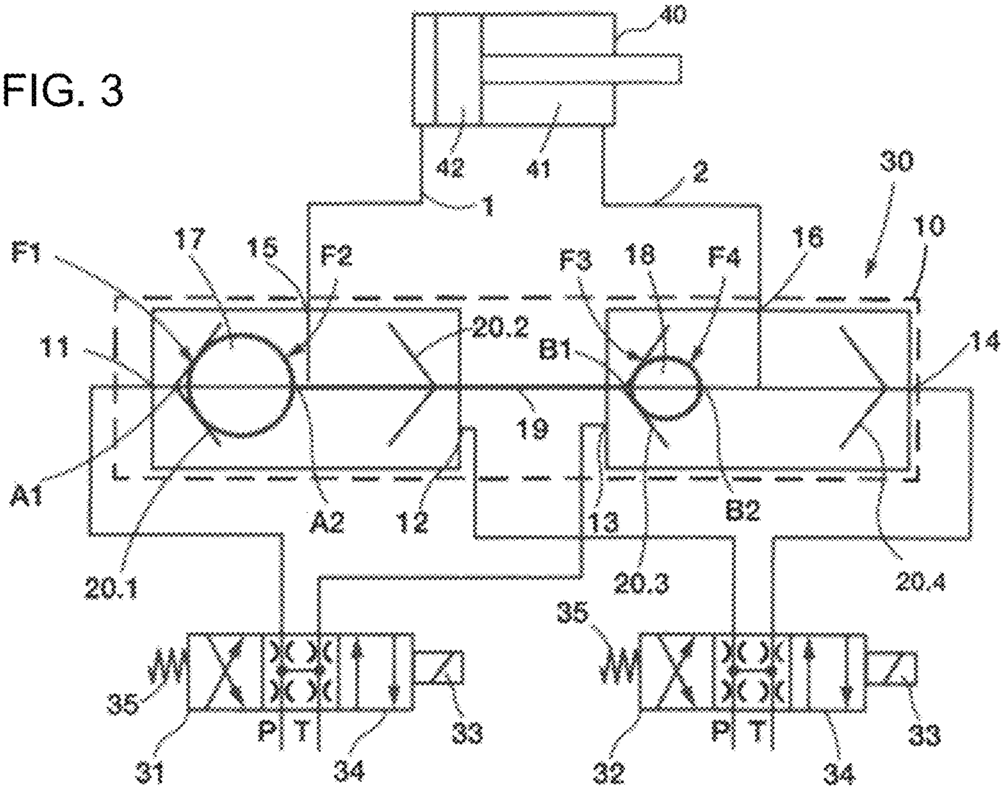
FIG. 3 shows a first exemplary embodiment of a pneumatic or hydraulic assembly according to the present invention including a directional control valve module according to the present invention and a shuttle valve according to the present invention.

FIG. 3 shows a pneumatic or hydraulic assembly according to the present invention including a double-acting cylinder 40, which has a piston chamber 41 and a piston 42 displaceable in the piston chamber 41. On a first axial side, the control pressure from the first control pressure line 1 opening into the piston chamber 41 is applied to the piston 42, and on a second axial side located opposite the first axial side, a control pressure from a second control pressure line 2 opening into the piston chamber 41 is applied to the piston 42. The control pressures in the first control pressure line 1 and the second control pressure line 2 are provided or set by a directional control valve module 30, which includes a shuttle valve 10 and two directional valves 31 and 32.

The shuttle valve 10 has a first inlet pressure port 11 and a second inlet pressure port 12 for a first control pressure. The first control pressure is provided at the first inlet pressure port 11 by the first directional valve 31, and the first control pressure is redundantly provided at the second inlet pressure port 12 by the second directional valve 32. The shuttle valve 10 furthermore has a third inlet pressure port 13 and a fourth inlet pressure port 14 for a second control pressure, wherein the second control pressure at the third inlet pressure port 13 is provided by the first directional valve 31 and is provided at the fourth inlet pressure port 14 by the second directional valve 32.

The shuttle valve has a first outlet pressure port 15, to which the first control pressure line 1 is connected, and a second outlet pressure port 16, to which the second control pressure line 2 is connected.

A first valve body 17 is arranged in a fluid-conducting connection between the first and second inlet pressure ports 11, 12 on the one hand and the first outlet pressure port 15 on the other hand. A second valve body 18 is arranged between the third and fourth inlet pressure ports 13, 14 on the one hand and the second outlet pressure port 16 on the other hand. The first control pressure from the first inlet pressure port 11 is accordingly applied to a first side A1 of the first valve body 17, and the first control pressure from the second inlet pressure port 12 is applied to a second side A2 situated opposite the first side. The second control pressure from the third inlet pressure port 13 is applied to a first side B1 of the second valve body 18, and the second control pressure from the fourth inlet pressure port 14 is applied to a second side B2 situated opposite thereto.

The first control pressure acts on each of a first and second control-pressure-charged surface F1, F2 of the first valve body 17, and the second control pressure acts on each of a third and fourth control-pressure-charged surface F3, F4 of the second valve body 18. The two valve bodies 17, 18 each effectuate a maximum pressure selection of the control pressures which act on them. The first surface F1 and the second surface F2 are in each case larger than the third surface F3 and the fourth surface F4. Furthermore, the two valve bodies 17, 18 are mechanically coupled to one another so as to always move together, in order to either accordingly completely or partially seal or expose the first and third inlet pressure ports 11, 13 or the second and fourth inlet pressure ports 12, 14. For this purpose, the two valve bodies 17, 18 are coupled to one another via a coupling element 19.

To be able to seal the inlet pressure ports 11, 12, 13, 14, the first valve body 17 cooperates with a first valve seat 20.1 and a second valve seat 20.2 so as to seal either the first inlet pressure port 11 or the second inlet pressure port 12. The second valve body 18 cooperates with a third valve seat 20.3 and a fourth valve seat 20.4 so as to seal either the third inlet pressure port 13 or the fourth inlet pressure port 14.

The first directional valve 31 and the second directional valve 32 each include a solenoid 33, serving as a drive, and a directional valve piston 34, which is displaced by the solenoid 33 against the force of a return spring 35, based on the control current of the controlled variable present at the solenoid 33, for example in the range of 4 to 20 mA.

As long as the directional control valve module 30 is operating properly, the same control pressures are present at the inlet pressure ports 11 and 12 and at the inlet pressure ports 13 and 14, namely the first control pressure is present at the inlet pressure ports 11 and 12 and the second control pressure is present at the inlet pressure ports 13 and 14. The valve bodies 17, 18 are in a center position so that the first control pressure is present in the first control pressure line 1 and the second control pressure is present in the second control pressure line 2.

If, for example, the second directional valve 32 fails, the return spring 35 thereof pushes the directional valve piston 34 into the zero position and connects the pressure connection P to the fourth inlet pressure port 14. The second inlet pressure port 12 is connected to the tank connection T of the second directional valve 32. Since the first valve body 17 has larger engagement surfaces F1, F2 for the pressure than the second valve body 18, the first valve body 17 urges the second valve body 18 into the fourth valve seat 20.4 so that the fourth inlet pressure port 14 is being sealed. The full control pressure P that is necessarily present at the fourth inlet pressure port 14 cannot find its way into the piston chamber 41, and the shuttle valve 10, together with the first valve body 17, is able to assume or maintain the control or regulation of the control pressures in the first control pressure line 1 and the second control pressure line 2 by itself.

If, in the other case, the first directional valve 31 fails, the return spring 35 thereof pushes the directional valve piston 34 thereof into the zero position and connects the pressure connection P thereof to the third inlet pressure port 13. The tank connection T of the first directional valve 31 is connected to the first inlet pressure port 11. Since, in turn, the first valve body 17 has the larger surfaces F1, F2 for the present control pressures than the second valve body 18, the first valve body 17 urges the second valve body 18 into the third valve seat 20.3 so that the control pressure of the pressure connection P at the first directional valve 31 cannot propagate into the rod-side piston chamber 41. The second directional valve 32 is given the control authority and assumes the control of the control pressures in the first control pressure line 1 and the second control pressure line 2 by itself.

Figure 4:
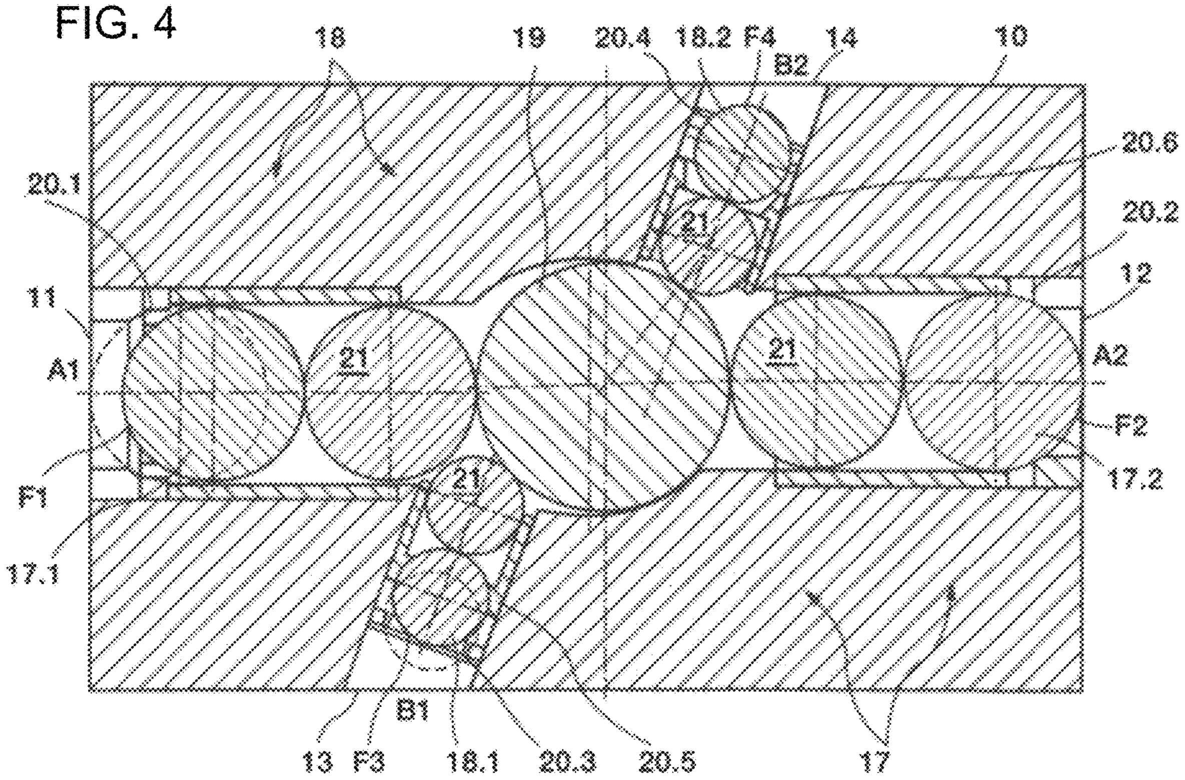
FIG. 4 shows a second exemplary embodiment of a shuttle valve according to the present invention, as can be used, for example, in the pneumatic or hydraulic assembly in FIG. 3.

Since, in practice, the solution shown in FIG. 3, having a connection of the two valve bodies 17, 18 via a rod or the like, requires comparatively complicated sealing, an improved embodiment of the shuttle valve 10 in this regard is proposed according to FIG. 4. In this embodiment, the first valve body 17 and the second valve body 18 each include multiple valve body parts, namely, the first valve body 17 includes the first valve body part 17.1 and the second valve body part 17.2, and the second valve body 18 includes the third valve body part 18.1 and the fourth valve body part 18.2. The coupling element 19 is positioned between the first valve body part 17.1 and the second valve body part 17.2, and between the third valve body part 18.1 and the fourth valve body part 18.2. For example, as is shown, the first valve body part 17.1, the coupling element 19, and the second valve body part 17.2 are arranged one behind the other in a first direction, and the third valve body part 18.1, the coupling element 19, and the fourth valve body part 18.2 are arranged one behind the other in a second direction, with the second direction being situated perpendicularly or obliquely on the first direction.

In the shown exemplary embodiment, the valve body parts 17.1, 17.2, 18.1, 18.2 do not rest directly against the coupling element 19, but via interposed spacer elements 21.

For example, all of the valve body parts 17.1, 17.2, 18.1, 18.2, the spacer elements 21, and the coupling element 19 are spherical. However, other shapes are also possible, in particular a cylindrical shape or also an angular shape.

The first valve body part 17.1 together with the first valve seat 20.1 seals the first inlet pressure port 11, the second valve body part 17.2 together with the second valve seat 20.2 seals the second inlet pressure port 12, the third valve body part 18.1 together with the third valve seat 20.3 seals the third inlet pressure port 13, and the fourth valve body part 18.2 together with the fourth valve seat 20.4 seals the fourth inlet pressure port 14, provided that corresponding pressure conditions are present at the inlet pressure ports 11, 12, 13 and 14.

Due to the size of the valve body parts 17.1, 17.2, 18.1, 18.2, the first valve body 17, which includes the valve body parts 17.1, 17.2, has larger control-pressure-charged surfaces F1, F2 than the second valve body 18 including the valve body parts 18.1, 18.2, which has the control-pressure-charged surfaces F3 and F4.

If, due to an accordingly large control pressure at the first inlet pressure port 11, the first valve body part 17.1, by way of the spacer elements 21, displaces the coupling element 19 and the second valve body part 17.2 so that the second valve body part 17.2 is pushed into the second valve seat 20.2, the fourth valve body part 18.2 is pushed at the same time, via the coupling element 19, into the fourth valve seat 20.4, while the pressure at the third inlet pressure port 13 lifts the third valve body part 18.1 off the third valve seat 20.3. Control of the control pressures in the control pressure lines 1 and 2 is thus achieved in a manner similar to the illustration of FIG. 3, which are accordingly connected to the shuttle valve 10, so that the first valve body 17 is, or the valve body parts 17.1, 17.2 of the first valve body 17 are, positioned between the first control pressure line 1 and the first two inlet pressure ports 11, 12, and the second valve body 18 is, or the valve body parts 18.1, 18.2 are, positioned between the second control pressure line 2 and the inlet pressure ports 13, 14.

Optionally, furthermore the fifth and sixth valve seats 20.5 and 20.6 are provided for the third and fourth valve body parts 18.1 and 18.2 so as to seal the third inlet pressure port 13 and the fourth inlet pressure port 14. The fifth valve body seat 20.5 is situated axially opposite the third valve body seat 20.3 and the sixth valve body seat 20.6 is situated axially opposite the fourth valve body seat 20.4 so that, when the third valve body part 18.1 is lifted off the third valve seat 20.3 due to the pressure at the third inlet pressure port 13, the third valve body part 18.1 together with the fifth valve body seat 20.5 seals the third inlet pressure port 13, and, when the fourth valve body part 18.2 is lifted off the fourth valve seat 20.4 due to the pressure at the fourth inlet pressure port 14, the fourth valve body part 18.2 together with the sixth valve body seat 20.6 seals the fourth inlet pressure port 14, in each case accordingly in the position of the coupling element 19 in which such lifting of the valve body parts 18.1, 18.2 off the respective valve seat 20.3, 20.4 is enabled, and with a sufficient pressure differential across the respective valve body part 18.1, 18.2. In an intermediate space laterally next to the coupling element 19, on the side of the first valve body part 17.1 or on the side of the second valve body part 17.2, diversion space is accordingly made available for the spacer element 21 to recede laterally next to the third valve body part 18.1 or the fourth valve body part 18.2.

The sealing at the fifth and sixth valve body seats 20.5, 20.6 can prevent leakage at the inlet pressure ports 13 or 14, and can reduce overall leakage.

LIST OF REFERENCE SIGNS

1 first control pressure line
2 second control pressure line
10 shuttle valve
10.1, 10.2 shuttle valve
11 first inlet pressure port
12 second inlet pressure port
13 third inlet pressure port
14 fourth inlet pressure port
15 first outlet pressure port
16 second outlet pressure port
17 first valve body
17.1 first valve body part
17.2 second valve body part
18 second valve body
18.1 third valve body part
18.2 fourth valve body part
19 coupling element
20.1 first valve seat
20.2 second valve seat
20.3 third valve seat
20.4 fourth valve seat
20.5 fifth valve seat
20.6 sixth valve seat
21 spacer element
30 directional control valve module
31 first directional valve
32 second directional valve
33 solenoid
34 directional valve piston
35 return spring
40, 40' cylinder
41 piston chamber
42 piston
43 piston spring
A1 first side of the first valve body
A2 second side of the first valve body
B1 first side of the second valve body
B2 second side of the second valve body
F1 first control-pressure-charged surface of the first valve body
F2 second control-pressure-charged surface of the first valve body
F3 third control-pressure-charged surface of the second valve body
F4 fourth control-pressure-charged surface of the second valve body While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A shuttle valve for selecting a maximum pressure in two control pressure lines that are separate from one another, the two control pressure lines being a first control pressure line and a second control pressure line, the shuttle valve comprising:

a first inlet pressure port;

a second inlet pressure port, the first inlet pressure port and the second inlet pressure port being configured for a first control pressure;

a third inlet pressure port;

a fourth inlet pressure port, the third inlet pressure port and the fourth inlet pressure port being configured for a second control pressure;

a first outlet pressure port configured for connecting the first control pressure line;

a second outlet pressure port configured for connecting the second control pressure line;

a first valve body in a fluid-conducting connection between the first inlet pressure port and the second inlet pressure port on the one hand and the first outlet pressure port on the other hand, the first valve body including a first valve body first side and a first valve body second side situated opposite the first valve body first side, the first valve body further including a first control-pressure-charged surface and a second control-pressure-charged surface; and a second valve body between the third inlet pressure port and the fourth inlet pressure port on the one hand and the second outlet pressure port on the other hand, the second valve body including a second valve body first side and a second valve body second side situated opposite the second valve body first side, the second valve body further including a third control-pressure-charged surface and a fourth control-pressure-charged surface, the first control-pressure-charged surface and the second control-pressure-charged surface in each case being larger than the third control-pressure-charged surface and the fourth control-pressure-charged surface, the first valve body and the second valve body being positively coupled and thereby being configured for being displaced together, the shuttle valve being configured such that:

the first control pressure from the first inlet pressure port is applied to the first valve body first side;

the first control pressure from the second inlet pressure port is applied to the first valve body second side;

the second control pressure from the third inlet pressure port is applied to the second valve body first side;

the second control pressure from the fourth inlet pressure port is applied to the second valve body second side;

the first control pressure respectively acts on the first control-pressure-charged surface and the second control-pressure-charged surface; and the second control pressure respectively acts on the third control-pressure-charged surface and the fourth control-pressure-charged surface.

2. The shuttle valve according to claim 1, further including a coupling element, which is configured for mechanically transmitting a displacement of the first valve body to the second valve body.

3. The shuttle valve according to claim 2, wherein the first valve body has a multi-piece configuration and thereby includes a first valve body part and a second valve body part, wherein the second valve body has a multi-piece configuration and thereby includes a third valve body part and a fourth valve body part, wherein the coupling element is positioned between the first valve body part and the second valve body part and between the third valve body part and the fourth valve body part.

4. The shuttle valve according to claim 3, further including a first valve seat, a second valve seat, a third valve seat, and a fourth valve seat, wherein the first valve body part is configured for cooperating with the first valve seat so as to form a first sealing point, the second valve body part is configured for cooperating with the second valve seat so as to form a second sealing point, the third valve body part is configured for cooperating with the third valve seat so as to form a third sealing point, and the fourth valve body part is configured for cooperating with a fourth valve seat so as to form a fourth sealing point.

5. The shuttle valve according to claim 4, wherein the first inlet pressure port is configured for sealing by way of the first sealing point, the second inlet pressure port is configured for sealing by way of the second sealing point, the third inlet pressure port is configured for sealing by way of the third sealing point, and the fourth inlet pressure part is configured for sealing by way of the fourth sealing point.

6. The shuttle valve according to claim 5, further including a fifth valve seat and a sixth valve seat, wherein the third valve body part is configured for cooperating with the fifth valve seat so as to form a fifth sealing point, the fourth valve body part is configured for cooperating with the sixth valve seat so as to form a sixth sealing point, the fifth valve seat is situated axially opposite the third valve seat and the sixth valve seat is situated axially opposite the fourth valve seat in such a way that the third inlet pressure port is configured for sealing, based on a position of the third valve body part, by way of the third sealing point and by way of the fifth sealing point, and the fourth inlet pressure port is configured for sealing, based on a position of the fourth valve body part, by way of the fourth sealing point and by way of the sixth sealing point.

7. The shuttle valve according to claim 3, wherein the first valve body part, the coupling element, and the second valve body part are arranged one behind the other in a first direction, and the third valve body part, the coupling element, and the fourth valve body part are arranged one behind the other in a second direction situated perpendicularly or obliquely relative to the first direction.

8. The shuttle valve according to claim 3, wherein the coupling element is spherical.

9. The shuttle valve according to claim 3, wherein each of the first valve body part, the second valve body part, the third valve body part, and the fourth valve body part is spherical.

10. The shuttle valve according to claim 3, further including a spacer element, wherein the spacer element is between the coupling element and at least one of the first valve body part, the second valve body part, the third valve body part, and the fourth valve body part, by way of which the coupling element is supported on at least one of the first valve body part, the second valve body part, the third valve body part, and the fourth valve body part.

11. The shuttle valve according to claim 10, wherein the spacer element is spherical.

12. The shuttle valve according to claim 11, wherein the coupling element and the first valve body and the second valve body rest freely against one another.

13. The shuttle valve according to claim 12, wherein the spacer element is a first spacer element, the shuttle valve further including a second spacer element, wherein the coupling element, the first valve body part, the second valve body part, the third valve body part, and the fourth valve body part and at least one of the first spacer element and the second spacer element rest freely against one another.

14. A directional control valve module, comprising:

two directional valves which are redundant relative to one another;

a shuttle valve configured for selecting a maximum pressure in two control pressure lines that are separate from one another and are a first control pressure line and a second control pressure line, the shuttle valve including:

a first inlet pressure port;

a second inlet pressure port, the first inlet pressure port and the second inlet pressure port being configured for a first control pressure;

a third inlet pressure port;

a fourth inlet pressure port, the third inlet pressure port and the fourth inlet pressure port being configured for a second control pressure;

a first outlet pressure port configured for connecting the first control pressure line;

a second outlet pressure port configured for connecting the second control pressure line;

a first valve body in a fluid-conducting connection between the first inlet pressure port and the second inlet pressure port on the one hand and the first outlet pressure port on the other hand, the first valve body including a first valve body first side and a first valve body second side situated opposite the first valve body first side, the first valve body further including a first control-pressure-charged surface and a second control-pressure-charged surface; and a second valve body between the third inlet pressure port and the fourth inlet pressure port on the one hand and the second outlet pressure port on the other hand, the second valve body including a second valve body first side and a second valve body second side situated opposite the second valve body first side, the second valve body further including a third control-pressure-charged surface and a fourth control-pressure-charged surface, the first control-pressure-charged surface and the second control-pressure-charged surface in each case being larger than the third control-pressure-charged surface and the fourth control-pressure-charged surface, the first valve body and the second valve body being positively coupled and thereby being configured for being displaced together, wherein the shuttle valve is configured such that:

the first control pressure from the first inlet pressure port is applied to the first valve body first side;

the first control pressure from the second inlet pressure port is applied to the first valve body second side;

the second control pressure from the third inlet pressure port is applied to the second valve body first side;

the second control pressure from the fourth inlet pressure port is applied to the second valve body second side;

the first control pressure respectively acts on the first control-pressure-charged surface and the second control-pressure-charged surface; and the second control pressure respectively acts on the third control-pressure-charged surface and the fourth control-pressure-charged surface, wherein the two directional valves are respectively configured for providing the first control pressure and the second control pressure and are connected respectively to two of the first inlet pressure port, the second inlet pressure port, the third inlet pressure port, and the fourth inlet pressure port of the shuttle valve in a control pressure-conducting manner.

15. The directional control valve module according to claim 14, wherein the two directional valves in each case are configured for being continuously adjustable and have electromagnetic actuation.

16. The directional control valve module according to claim 15, wherein each of the two directional valves includes a solenoid, a directional valve piston and a return spring, the solenoid being configured for serving as a drive and for displacing the directional valve piston against a force of the return spring.

17. An assembly which is a pneumatic assembly or a hydraulic assembly, the assembly comprising:

a double-acting cylinder, which includes a piston chamber and a piston which is configured for displacing in the piston chamber, the piston including a piston first side and a piston second side opposite the piston first side; and a directional control valve module, including:

two directional valves which are redundant relative to one another;

a shuttle valve configured for selecting a maximum pressure in two control pressure lines that are separate from one another and are a first control pressure line and a second control pressure line, the shuttle valve including:

a first inlet pressure port;

a second inlet pressure port, the first inlet pressure port and the second inlet pressure port being configured for a first control pressure;

a third inlet pressure port;

a fourth inlet pressure port, the third inlet pressure port and the fourth inlet pressure port being configured for a second control pressure;

a first outlet pressure port configured for connecting the first control pressure line;

a second outlet pressure port configured for connecting the second control pressure line;

a first valve body in a fluid-conducting connection between the first inlet pressure port and the second inlet pressure port on the one hand and the first outlet pressure port on the other hand, the first valve body including a first valve body first side and a first valve body second side situated opposite the first valve body first side, the first valve body further including a first control-pressure-charged surface and a second control-pressure-charged surface; and a second valve body between the third inlet pressure port and the fourth inlet pressure port on the one hand and the second outlet pressure port on the other hand, the second valve body including a second valve body first side and a second valve body second side situated opposite the second valve body first side, the second valve body further including a third control-pressure-charged surface and a fourth control-pressure-charged surface, the first control-pressure-charged surface and the second control-pressure-charged surface in each case being larger than the third control-pressure-charged surface and the fourth control-pressure-charged surface, the first valve body and the second valve body being positively coupled and thereby being configured for being displaced together, wherein the shuttle valve is configured such that:

the first control pressure from the first inlet pressure port is applied to the first valve body first side;

the first control pressure from the second inlet pressure port is applied to the first valve body second side;

the second control pressure from the third inlet pressure port is applied to the second valve body first side;

the second control pressure from the fourth inlet pressure port is applied to the second valve body second side;

the first control pressure respectively acts on the first control-pressure-charged surface and the second control-pressure-charged surface; and the second control pressure respectively acts on the third control-pressure-charged surface and the fourth control-pressure-charged surface, wherein the two directional valves are respectively configured for providing the first control pressure and the second control pressure and are connected respectively to two of the first inlet pressure port, the second inlet pressure port, the third inlet pressure port, and the fourth inlet pressure port of the shuttle valve in a control pressure-conducting manner, wherein the first outlet pressure port is connected on the piston first side to the piston chamber in a pressure-conducting manner;

wherein the second outlet pressure port is connected on the piston second side to the piston chamber in a pressure-conducting manner.

* * * * *